United States Patent

Jewell et al.

[11] 3,907,796
[45] Sept. 23, 1975

[54] IMIDAZO-S-TRIAZINEDIONES AND PYRIMIDO-S-TRIAZINEDIONES

[75] Inventors: Richard A. Jewell, Landenberg, Pa.; Kang Lin, Newark, Del.

[73] Assignee: E. I. Du Pont de Nemours and Company, Wilmington, Del.

[22] Filed: May 24, 1974

[21] Appl. No.: 473,225

[52] U.S. Cl. 260/249.5; 71/93; 260/482 C; 260/468 E; 260/553 R; 260/347.3
[51] Int. Cl.² C07D 251/08
[58] Field of Search 260/249.5

[56] References Cited
UNITED STATES PATENTS
3,637,684  1/1972  Goldman ................ 260/249.5
FOREIGN PATENTS OR APPLICATIONS
2,254,200  5/1974  Germany

*Primary Examiner*—John M. Ford

[57] ABSTRACT

Herbicidal triazenediones of the formula

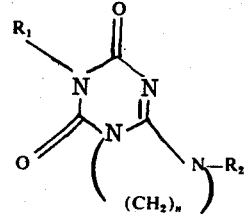

wherein
$R_1$ is certain organic radicals and $R_2$ is hydrogen or methyl.

Exemplary of such compounds is: 3-cyclohexyl-6,7-dihydro-8-methylimidazo-[1,2-a]-s-triazine-2,4-(3H,8H)-dione.

3 Claims, No Drawings

IMIDAZO-S-TRIAZINEDIONES AND BYRIMIDO-S-TRIAZINEDIONES

BACKGROUND OF THE INVENTION

Johnson "Pesticides 72," *Chemical Week*, June 21 and July 26, 1972, lists several commercial and experimental s-triazine herbicides. Among these are atrazine, simazine, prometone, and prometryne:

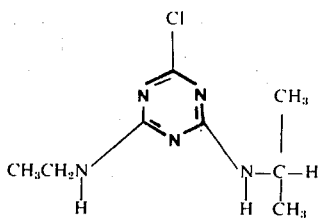
atrazine

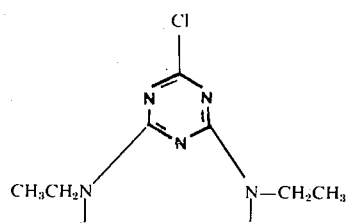
simazine

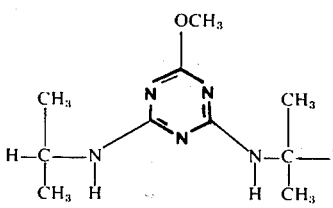
prometone

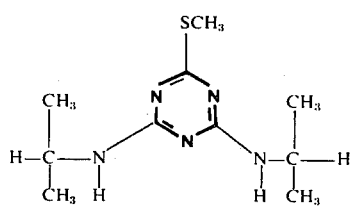
prometryne

Copending U.S. Patent Application Ser. No. 348,321, filed Apr. 5, 1973 now abandoned, by Kang Lin (which is a continuation-in-part of U.S. Patent Application Ser. No. 256,249, filed May 24, 1972, now abandoned) discloses a class of s-triazines of the general formula:

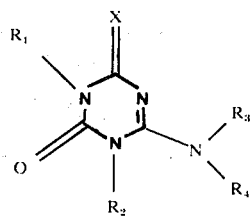

II where
X is oxygen or sulfur;
R₁ is certain organic radicals including certain open-chain and cyclic radicals;
R₂ is hydrogen, lower alkyl, or certain cations;
R₃ is hydrogen or certain lower alkyls; and
R₄ is certain organic radicals.
These compounds are disclosed as being useful as herbicides.

The compounds of the present invention result from efforts to develop new herbicidal compounds.

SUMMARY OF THE INVENTION

This invention relates to novel compounds of the following formula and their use as herbicides:

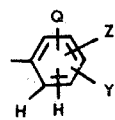

I wherein
$R_1$ is alkyl of 2 through 8 carbon atoms, alkenyl of 3 through 6 carbon atoms, alkynyl of 3 through 6 carbon atoms, cycloalkyl of 4 through 8 carbon atoms, cycloalkenyl of 5 through 8 carbon atoms, cycloalkylmethyl of 4 through 9 carbon atoms, cycloalkenylmethyl of 6 through 9 carbon atoms, bicycloalkyl or bicycloalkenyl of 7 through 10 carbon atoms, bicycloalkylmethyl or bicycloalkenylmethyl of 8 through 11 carbon atoms, trimethylcyclohexyl, tetramethylcyclohexyl, or tetrahydro-2-pyranyl; or

III wherein
Q is hydrogen, fluorine, chlorine, bromine, alkyl of 1 through 4 carbon atoms, alkoxy or alkylthio of 1 through 2 carbon atoms, nitro, or trifluoromethyl;
Y is hydrogen, chlorine, or methyl; and
Z is hydrogen or chlorine;
the above alkyl groups substituted with one methoxy, ethoxy, methylthio, or ethylthio group; the above cycloalkyl groups substituted with one alkyl of 2 through 4 carbon atoms, 1 through 2 methyl groups, 1 through 2 chlorines or bromines, one methoxy or one ethoxy group; and
$R_2$ is hydrogen or methyl; and
$n$ is 2 or 3.

This invention also includes herbicidal compositions containing the above compounds as active ingredients and methods of controlling undesirable vegetation by applying the compounds and/or compositions.

DESCRIPTION OF THE INVENTION

Preferred Compounds

Certain of the compounds of formula I are preferred because of their higher herbicidal activity and ease of synthesis. These include those compounds of formula I where $R_1$ is alkyl of 3 through 6 carbon atoms, cycloalkyl of 5 through 8 carbon atoms, or cycloalkyl of 5 through 8 carbon atoms substituted with one methyl group;

$R_2$ is methyl; and $n$ is 2.

The most preferred compound from within this group is 3-cyclohexyl-6,7-dihydro-8-methylimidazo[1,2-a]-s-triazine-2,4-(3H,8H)-dione.

Synthesis of the Compounds

The compounds of formula I can be made by the process described and exemplified below:

A method for preparing the compounds of this invention starts with a 2-methyl-2-thiopseudourea salt such as the sulfate or hydrochloride. A schematic representation of this method is shown by equations 1 through 5 below:

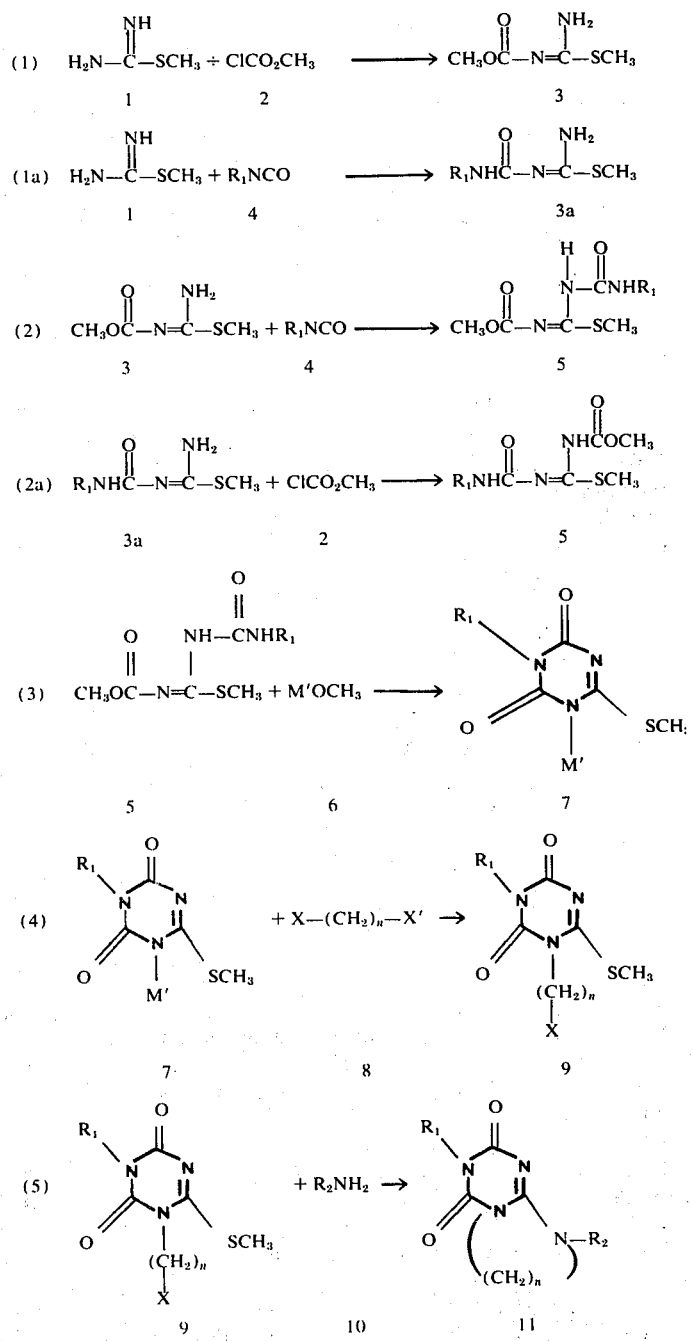

wherein:
R₁, R₂, and n are as previously defined;
M' is an alkali metal; and
X and X' are leaving groups such as p-toluenesulfonate, methanesulfonate, chlorine, bromine, or iodine.

A suspension or solution of compound 1 is made in the selected solvent and treated with methylchloroformate (Equation 1) or an isocyanate of the formula R₁NCO (Equation 1a) until the reaction is complete. The product, a 1-carbomethoxy-2-methyl-2-thiopseudourea (compound 3) or a 1-substituted-4-methyl-4-thiopsuedobiuret (compound 3a) is treated with an isocyanate of formula R₁NCO (Equation 2) or methyl chloroformate (Equation 2a) to give compound 5. A solution of compound 5 in a suitable solvent is treated with an alkali metal alkoxide to give the salt 7 (Equation 3). A solution or slurry of compound 7 in a selected solvent is reacted with a 1,2-disubstituted ethane or 1,3-disubstituted propane (compound 8) in which the substituents X and X' are leaving groups such as those listed above, to give compound 9 (Equation 4). A suspension or solution of compound 9 is then reacted with methylamine or ammonia (compound 10) in a suitable solvent to give compound 11 (Equation 5). The product, an imidazo [1,2-a]-s-triazine-2,4(3H,8H)-dione or a pyrimido[1,2-a]-s-triazine-2,4(3H)-dione, can be isolated by conventional techniques which in some cases include the use of chromatography for purification.

The solvents which can be used in these reactions are water, methanol, toluene, benzene, xylene, monochlorobenzene, nitrobenzene, methylene chloride, dimethylformamide, trichloroethylene, and tetrachloroethylene. The preferred solvent for the conversion in Equation 1 is water although mixtures of water and the organic solvent listed above can be used. A mixture of water and organic solvents is preferred for the reaction in equation 1a since the isocyanate reacts with water to form undesired by-products. The yield of compound 3a could be seriously effected by these side reactions.

The reactions 1 and 1a can be carried out from −10°C. to 50°C. but preferably from 0° to 30°C., and most preferably from 0° to 25°C.

The pH in reactions 1, 1a, and 2a can be varied preferably from 6.5 to 11 and most preferably from 7 to 8.5.

The order of addition of the reagents methyl chloroformate and isocyanate (R₁NCO) versus addition of aqueous base can be varied. The methyl chloroformate or isocyanate can be added first followed by the aqueous base, but preferred is the simultaneous addition of methyl chloroformate or isocyanate and the aqueous base. The base can be selected from lithium, sodium, and potassium hydroxide. The strength of the base to be added can be varied from 10 to 50% but the higher concentration of base is most preferred because of the lower reaction volume for a given amount of product.

This simultaneous addition of methyl chloroformate or isocyanate and 50% aqueous base gives a higher yield of product 3 or 3a because of the controlled pH conditions and shorter contact time with water required for completion of the reaction.

The reactions 2 and 2a are preferably carried out between 0° and 50°C. and most preferably between 15° and 35°C.

The compound 5 is preferably treated with 0.6 to 1.3 equivalents of alkali metal alkoxide and most preferably with 0.9 to 1.1 equivalents. The alkoxide can be used as the pure base or preferably as a solution in a suitable solvent and most preferably as a 15 to 35% solution in the corresponding alcohol.

The solution of compound 5 can be cyclized to compound 7 by use of an alkali metal hydroxide, but an alcoholic solvent must be added to dissolve the hydroxide before cyclization occurs. The cyclization of compound 5 to compound 7 (Equation 3) takes place preferably at 25° to 70°C. but most preferably at 45° to 70°C.

The removal of solvent to give a slurry of compound 7 can be carried out under reduced pressure or at atmospheric pressure at a temperature of 20°C. to 135°C. but most preferably from 25° to 50°C. under reduced pressure and from 65° to 100°C. at atmospheric pressure.

The 1,2-disubstituted ethane or 1,3-disubstituted propane used in the alkalation of compound 7 is preferably a halosulfonate such as 2-chloroethyl methanesulfonate, 2-chloroethyl p-toluenesulfonate, 3-chloropropyl methanesulfonate, or 3-chloropropyl p-toluenesulfonate. The alkylation reaction is preferably carried out in a polar anhydrous solvent such as dimethylformamide or acetonitrile at 50° to 130°C. When the reaction is complete, the solvent is evaporated under reduced pressure. The residue is treated with a mixture of dilute aqueous base and methylene chloride. The methylene chloride layer is separated, dried, and evaporated to give compound 9. The product can be purified by recrystallization or chromatography or may be used directly in the next reaction.

The conversion of compound 9 to compound 11 is carried out preferably in a water-miscible solvent such as methanol. An excess of aqueous methylamine or ammonia is added to a solution or suspension of compound 9 and the mixture is heated at 30° to 65°C. until the reaction is completed. The solvent is evaporated and the crude imidazo [1,2-a]-s-triazine-2,4(3H,8H)-dione or pyrimido[1,2-a]-s-triazine-2,4(3H)-dione is purified by recrystallization or chromotography.

The following Examples and Tables further illustrate this method of synthesis for the compounds of the present invention. All parts are by weight and all temperatures are in degrees centigrade unless otherwise indicated.

Example 1

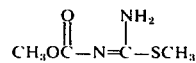

To a solution of 69.5 parts of 2-methyl-2-thiopseudourea sulfate and 47 parts of methyl chloroformate in 1,000 parts of water at 0° is added dropwise 56.9 parts of potassium hydroxide in 200 parts of water. The reaction mixture is stirred at room temperature for three hours and then extracted with methylene chloride. The methylene chloride extract is dried and the solvent evaporated on a rotary evaporator to give 45 parts of methyl N-(1-amino-1-methylthiomethylene)carbamate, m.p. 72°–77°C.

Example 2

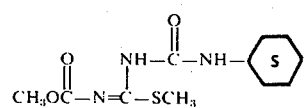

74 Parts of the compound produced by Example 1, above, and 63 parts of cyclohexyl isocyanate in 300 parts of methylene chloride are stirred overnight. The solvent is evaporated on a rotary evaporator to give 128 parts of methyl 4-cyclohexyl-N-methoxycarbonyl-1-thioallophanimidate, m.p. 85°–86°C.

The following compounds in Table 1 can be prepared similarly.

TABLE I

| $R_1$ in $CH_3O\overset{O}{C}-N=\overset{SCH_3}{C}-NH-\overset{O}{C}-NH-R_1$ | m.p. |
|---|---|
| cyclopentyl-S | |
| 2-methylcyclohexyl-S | |
| –CHCH₃ with CH₃ | m.p. 129–132 |
| 3-methylcyclohexyl-S | |
| 4-methylcyclohexyl-S | |
| cycloheptyl-S | |
| 3,5-dimethylcyclohexyl-S | |
| phenyl | |
| 4-chlorophenyl | m.p. 127–128 |
| 4-chlorocyclobutyl | m.p. 173–174.5 |
| 1-methylcyclopentyl | |
| –CH₂–(S-phenyl) | m.p. 132–134 |
| decalinyl | m.p. 81–90 |

Example 3

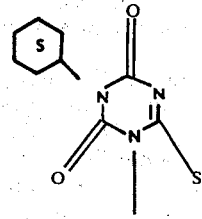

100 Parts of the compound of Example 2 is refluxed for one hour with 20 parts of sodium methoxide in 200 parts of methanol. The methanol is evaporated on a rotary evaporator and the triazinedione sodium salt is dissolved in 200 parts of water. The aqueous solution is neutralized with hydrochloric acid. The solid is filtered off and dried to yield 75 parts of 3-cyclohexyl-6-methylthio-s-triazine-2,4(1H,3H)-dione, m.p. 225°–257°C.

The triazines following in Table II can be cyclized from the appropriate thioallophanimidate in a similar fashion:

TABLE II

| $R_1$ | m.p. |
|---|---|
| cyclopentyl-S | m.p. 201–204 |
| –CHCH₃ with CH₃ | m.p. 188–190 |
| 2-methylcyclohexyl-S | m.p. 117–120 |
| 3-methylcyclohexyl-S | |
| cycloheptyl-S | |
| 3,5-dimethylcyclohexyl-S | |
| phenyl | |

TABLE II-Continued

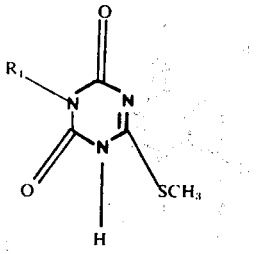

| R₁ | | |
|---|---|---|
|  | Cl | m.p. 292-295 |
|  | Cl | m.p. 167-169 |
|  | | m.p. 192-195.5 |
|  | | m.p. 177.5-178 |
|  | | m.p. 145-148 |

Example 4

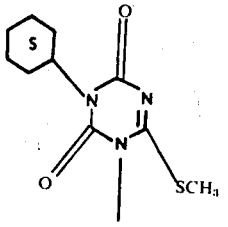

100 Parts of the compound of Example 3 is added to a solution of 23 parts of sodium methoxide in 300 parts of methanol. The mixture is evaporated on a rotary evaporator and the resulting triazinedione sodium salt is dried. The sodium salt is placed in 200 parts of dimethylformamide and 97 parts of 2-chloroethyl-p-toluenesulfonate are added. The mixture is heated on a steam bath for 2.5 hours and then evaporated under vacuum. To the residue is added 500 parts of methylene chloride and 500 parts of 2% aqueous sodium carbonate solution. The mixture is shaken and then the methylene chloride layer is dried over anhydrous sodium sulfate, filtered, and evaporated on a rotary evaporator to afford 74 parts of 1-(2-chloroethyl)-3-cyclohexyl-6-methylthio-s-triazine-2,4(1H,3H)-dione as a oil. $N_D^{25} = 1.5596$.

The following compounds in Tables III and IV can be prepared similarly by using the appropriate triazinediones and 2-chloroethyl p-toluenesulfonate or 3-chloropropyl p-toluenesulfonate:

TABLE III

| R₁ | R₁ |
|---|---|
|  | 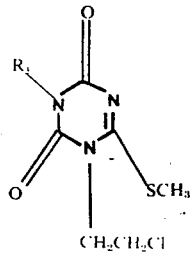 |
|  |  |
|  |  |
|  |  |
|  |  |
|  |  |
|  |  |
|  | |

TABLE IV

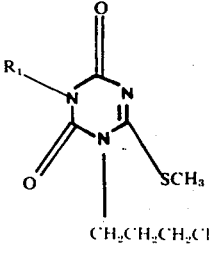

| R₁ |
|---|
|  |
|  |

Example 5

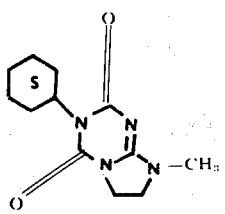

100 Parts of the compound of Example 4 is mixed with 800 parts of methanol and 70 parts of 40% aqueous methylamine. The solution is stirred for two hours at 25°C. and then refluxed for one hour. The solvent is evaporated and the residue is chromotographed using SilicAR CC-7 (Mallinckrodt Chemical Works, St. Louis, Missouri) with chloroform eluent. Several by-products are eluted first, followed slowly by the desired product. At this point the eluting solvent is changed to methanol in order to more rapidly elute the product. The fractions containing the product are combined and evaporated on a rotary evaporator. The residue is triturated in cold carbon tetrachloride and then dissolved in benzene and filtered to remove a small amount of insoluble material. The benzene filtrate is then evaporated on a rotary evaporator affording 30 parts of 3-cyclohexyl-6,7-dihydro-8-methylimidazo[1,2-a]-s-triazine-2,4(3H,8H)-dione, m.p. 172°–176°C.

In a similar fashion the imidazotriazinediones and pyrimidotriazinediones listed in Table V below can be prepared by using the appropriate 1-(2-chloroethyl)-triazinedione or 1-(3-chloropropyl)-triazinedione and methylamine or ammonia.

TABLE V

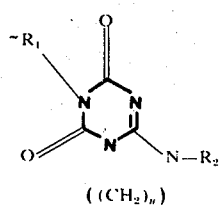

| $R_1$ | $R_2$ | n |
|---|---|---|
| C$_6$H$_5$S– | –CH$_3$ | 3 |
| C$_6$H$_5$S– | –H | 2 |
| C$_6$H$_5$S– | –H | 3 |
| cyclopentyl | –CH$_3$ | 2 |
| cyclopentyl | –H | 2 |
| cyclopentyl | –CH$_3$ | 3 |
| cyclopentyl | –H | 3 |
| CH$_3$CH(CH$_3$)– | –CH$_3$ | 2 |
| CH$_3$CH(CH$_3$)– | –H | 2 |
| CH$_3$CH(CH$_3$)– | –CH$_3$ | 3 |
| CH$_3$CH$_2$– | –CH$_3$ | 2 |
| CH$_3$CH$_2$CH(CH$_3$)– | –CH$_3$ | 2 |
| CH$_3$(CH$_2$)$_4$CH(CH$_2$CH$_3$)– | –CH$_3$ | 2 |
| CH$_2$=CH–CH$_2$– | –CH$_3$ | 2 |
| CH$_2$=CH–CH(CH$_3$)– | –CH$_3$ | 2 |
| CH$_2$=CH–CH(CH$_2$CH$_3$)– | –CH$_3$ | 2 |
| HC≡C–CH$_2$– | –CH$_3$ | 2 |
| HC≡C–CH(CH$_3$)– | –CH$_3$ | 2 |
| HC≡C–CH(CH$_2$CH$_2$CH$_3$)– | –CH$_3$ | 2 |
| Cl-cyclobutyl | –CH$_3$ | 2 |
| cycloheptyl | –CH$_3$ | 2 |
| cyclooctyl | –CH$_3$ | 2 |
| cyclopentyl | –CH$_3$ | 2 |
| cyclohexyl | –CH$_3$ | 2 |
| cyclooctenyl | –CH$_3$ | 2 |
| cyclopropyl-CH$_2$– | –CH$_3$ | 2 |
| cyclopentyl-CH$_2$– | –CH$_3$ | 2 |
| (C$_6$H$_5$S)-CH$_2$– | –CH$_3$ | 2 |
| cyclooctyl-CH$_2$– | –CH$_3$ | 2 |

TABLE V-Continued
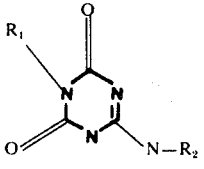
| $R_1$ | $R_2$ | n |
|---|---|---|
| 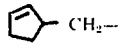 | —CH₃ | 2 |
| 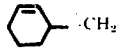 | —CH₃ | 2 |
| 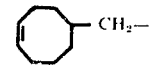 | —CH₃ | 2 |
|  | —CH₃ | 2 |
|  | —CH₃ | 2 |
|  | —CH₃ | 2 |
|  | —CH₃ | 2 |
|  | —CH₃ | 2 |
|  | —CH₃ | 2 |
|  | —CH₃ | 2 |
|  | —CH₃ | 2 |
|  | —CH₃ | 2 |
| 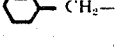 | —CH₃ | 2 |
TABLE V-Continued
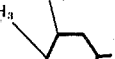
| $R_1$ | $R_2$ | n |
|---|---|---|
| 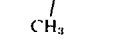 | —CH₃ | 2 |
| 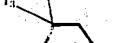 | —CH₃ | 2 |
| 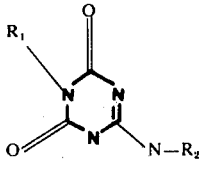 | —CH₃ | 2 |
|  | —CH₃ | 2 |
| 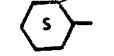 | —CH₃ | 2 |
| 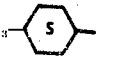 | —CH₃ | 2 |
|  | —CH₃ | 2 |
|  | —CH₃ | 2 |
| 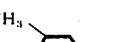 | —CH₃ | 2 |
|  | —CH₃ | 2 |
| 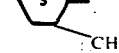 | —CH₃ | 2 |
| 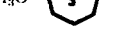 | —CH₃ | 2 |
|  | —CH₃ | 2 |
| 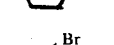 | —CH₃ | 2 |
| 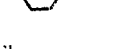 | —CH₃ | 2 |
| 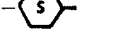 | —CH₃ | 2 |
| 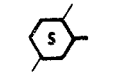 | —CH₃ | 2 |
|  | —CH₃ | 2 |
| CH₃OCH₂CH₂CH₂— | —CH₃ | 2 |
| CH₃CH₂OCH₂— | —CH₃ | 2 |
| CH₃SCH₂CH₂CH₂— | —CH₃ | 2 |

TABLE V-Continued

R₁ structure with triazine ring, ((CH₂)ₙ)

| R₁ | R₂ | n |
|---|---|---|
| CH₃CH₂SCH₂CH₂— | —CH₃ | 2 |
| C₆H₅— (phenyl) | —CH₃ | 2 |
| Cl-C₆H₄— | —CH₃ | 2 |
| Cl-C₆H₄— | —H | 2 |
| Cl-C₆H₄— | —CH₃ | 3 |
| Cl-C₆H₄— | —H | 3 |
| F-C₆H₄— | —CH₃ | 2 |
| Br-C₆H₄— | —CH₃ | 2 |
| Cl,Cl-C₆H₃— (dichloro) | —CH₃ | 2 |
| Cl,CH₃-C₆H₃— | —CH₃ | 2 |
| Cl,Cl-C₆H₃— | —CH₃ | 2 |
| CH₃-C₆H₄— | —CH₃ | 2 |
| (CH₃)₂CH-C₆H₄— | —CH₃ | 2 |
| CH₃CH₂CH₂CH₂-C₆H₄— | —CH₃ | 2 |
| (CH₃)₃C-C₆H₄— | —CH₃ | 2 |
| CH₃O-C₆H₄— | —CH₃ | 2 |
| CH₃CH₂O-C₆H₄— | —CH₃ | 2 |
| CH₃S-C₆H₄— | —CH₃ | 2 |
| CH₃CH₂-C₆H₄— | —CH₃ | 2 |
| CH₃,CH₃-C₆H₃— (dimethyl) | —CH₃ | 2 |
| tetrahydropyranyl | —CH₃ | 2 |
| O₂N-C₆H₄— | —CH₃ | 2 |
| F₃C-C₆H₄— | —CH₃ | 2 |
| (CH₃)₃C— | —CH₃ | 2 |

Formulations of the Compounds

The formulations of the compounds of Formula 1 for use in this invention can be prepared in conventional ways. They include wettable powders, suspensions, and solutions in solvents and oils, aqueous dispersions, granules, pellets, and high-strength compositions. Many of these can be applied directly. Sprayable formulations can be extended in suitable media and used at spray volumes of from a few prints to several hundred gallons per acre. High-strength compositions are primarily used as intermediates for further formulation. Broadly speaking, these formulations consist essentially of about 1 to 99% by weight of herbicidally active material (including at least one compound of formula 1 in a herbicidally effective amount) and at least one of (a) about 0.1 to 20% by weight of surface active agents and (b) about 5 to 99% by weight of solid or liquid diluents. More specifically, the various types of formulations will generally contain these ingredients in the following approximate proportions:

| | Percent by Weight | | |
|---|---|---|---|
| | Herbicide | Diluent | Surfactant |
| Wettable Powders | 25–90 | 0–74 | 1–10 |
| Suspensions or Solutions | 5–50 | 40–95 | 0–10 |
| Aqueous Dispersions | 10–50 | 40–89 | 1–10 |
| Granules and Pellets | 1–35 | 65–99 | 0–15 |
| High-Strength Composition | 90–99 | 0–10 | 0–2 |

The actual percentages that will be desirable for a given composition will depend upon its intended use and the physical and chemical properties of the active ingredients.

The compounds of formula 1 can be combined with other herbicides and are particularly useful in combination with bromacil [3-(sec-butyl)-5-bromo-6-methyluracil], diuron [3-(3,4-dichlorophenyl)-1,1-dimethylurea], paraquat (1,1'-dimethyl-4,4'-bipyridinium ion), m-(3,3-dimethylureido)phenyl-tert-butylcarbamate, 4-amino-6-tert-butyl-3-methylthio-astriazine-5(4H)-one, and the s-triazines such as 2-chloro-4-ethylamino-6-isopropylamino-s-triazine, for controlling a broad spectrum of weeds.

Typical solid diluents are described in Watkins et al. "Handbook of Insecticide Dust Diluents and Carriers," Second Edition, Dorland Books, Caldwell, N.J. The more absorptive diluents are preferred for wettable powders. Typical liquid diluents and solvents are described in Marsden, "Solvents Guide," Second Edition, Interscience, N.Y., 1950. Solubility under 0.1% is preferred for suspension concentrates; solution concentrates are preferably stable against phase separation at 0°C. "McCutcheon's Detergents and Emulsifiers Annual," Allured Publ. Corp., Ridgewood, N.J., as well as Sisely and Wood, "Encyclopedia of Surface Active Agents," Chemical Publ. Co., Inc., N.Y., 1964, lists surfactants and recommended uses. All formations can contain minor amounts of additives to reduce foam, caking, corrosion, microbiological growth, etc. Preferably, ingredients should be approved by the U.S. Environmental Agency for the use intended.

The manner of making and using such herbicidal formulations is described in numerous patents, see, for example, Luckenbaugh, U.S. Pat. No. 3,309,192; Loux, U.S. Pat. No. 3,235,357; Todd, U.S. Pat. No. 2,655,445; Hamm et al., U.S. Pat. No. 2,863,752; Sherer et al., U.S. Pat. No. 3,079,244; Gysin et al., U.S. Pat. No. 2,891,855, and Barrous, U.S. Pat. No. 2,642,354.

Typical formulations are shown in the following examples.

| Solution | Percent |
|---|---|
| 3-(4-methoxycyclohexyl)-6,7-dihydro-8-methyl-limidazo-[1,2-a]-s-triazine-2,4-(3H,8H)-dione | 26% |
| isophorone | 50% |
| xylene | 16% |
| blend of oil-soluble sulfonates with polyoxy-ethylene ethers | 8% |

The ingredients are combined and stirred to produce a solution which can be emulsified into water for spraying.

| Wettable Powder | Percent |
|---|---|
| 3-cyclohexyl-6,7-dihydro-8-methylimidazo-[1,-2-a]-s-triazine-2,4-(3H,8H)-dione | 25% |
| diatomaceous earth | 71.5% |
| dioctylsodium sulfosuccinate | 1.5% |
| low viscosity methyl cellulose | 2% |

The ingredients are thoroughly blended and passed through a hammer mill to produce particles essentially below 100 microns. All other compounds of this invention can be formulated in a like manner.

| Extruded Pellet | Percent |
|---|---|
| 3-cyclohexyl-6,7-dihydro-8-methylimidazo-[1,-2-a]-s-triazine-2,4(3H,8H)-dione | 25% |
| anhydrous sodium sulfate | 10% |
| crude calcium ligninsulfonate | 5% |
| sodium alkylnaphthylenesulfonate | 1% |
| calcium magnesium bentonite | 59% |

The ingredients are blended, hammer-milled, and then moistened with about 12% water. The mixture is extruded as cylinders about 3 millimeters in diameter which are cut to produce pellets about 3 millimeters long. These may be used directly after drying or the dried pellets may be crushed to pass a U.S.S. No. 20 sieve (0.84 millimeters openings). The granules held on a U.S.S. No. 40 sieve (0.42 millimeters openings) may be packaged for use and the finds recycled.

| Wettable Powder | Percent |
|---|---|
| 3-(3,4-dichlorocyclohexyl)-6,7-dihydro-8-methyl-limidazo-[1,2-a]-s-triazine-2,4-(3H,8H)-dione | 40% |
| dioctylsodium sulfosuccinate | 1.5% |
| sodium ligninsulfonate | 3% |
| low viscosity methyl cellulose | 1.5% |
| attapulgite | 54% |

The ingredients are thoroughly blended, passed through an air mill to produce an average particle size under 15 microns, reblended, and shifted through a U.S.S. No. 50 sieve (0.3 millimeters opening) before packaging. All the compounds of the invention may be formulated in the same manner.

| Aqueous Suspension | Percent |
|---|---|
| 3-(4-t-butylcyclohexyl)-6,7-dihydro-8-methyl-limidazo-[1,2-a]-s-triazine-2,4-(3H,8H)-dione | 25% |
| hydrated attapulgite | 3% |
| crude calcium ligninsulfonate | 10% |
| sodium dihydrogen phosphate | 0.5% |
| water | 61.5% |

The ingredients are ground together in a ball or roller mill until the solid particles have been reduced to diameters under 10 microns.

| High-Strength Compositions | Percent |
|---|---|
| 3-cyclohexyl-6,7-dihydro-8-methylimidazo-[1,-2-a]-s-triazine-2,4-(3H,8H)-dione | 90% |
| synthetic silica | 5% |
| sodium lauryl sulfate | 2% |
| partially desulfonated sodium ligninsulfonate | 3% |

The above ingredients are ground to pass a 0.25 mm. screen. This product can be used directly or is suitable for further formulations.

| Mixture | Percent |
|---|---|
| 3-cyclohexyl-6,7-dihydro-8-methylimidazo-[1,-2-a]-s-triazine-2,4-(3H,8H)-dione | 25% |
| diuron | 50% |
| attapulgite clay | 20% |
| synthetic silica | 2% |
| sodium alkylnaphthylene sulfonate | 2% |
| sodium ligninsulfonate | 15 |

The above ingredients are blended and hammer milled to a particle size essentially below 50 microns followed by reblending.

Use of the Compounds

The compounds of formula 1 are useful for the control of undesired vegetation. They are broad spectrum herbicides ideally suited to destroy weeds on industrial sites, parking lots, railroad yards, around farm buildings, etc. The compounds can be applied both preemergence and postemergence.

The precise amount to be used in any given situation will vary according to the length of control desired, the use involved, the plant species and soil type, the mode of application, prevailing weather conditions, foilage density, and like factors. Hence, it is not possible to state a rate of application suitable for all situations; however, generally, the compounds of this invention are used at levels of about one kilogram per hectare to about 25 kilograms per hectare.

The herbicidal activity of the compounds of this invention is demonstrated by the following greenhouse tests. Seeds of crabgrass (Digitarria spp.), barnyardgrass (Echinochloa crus-galli), wild oats (Avena Fatua), Cassia tora, morning glory (Ipomoea spp.), cocklebur (Xanthium spp.), sorghum, corn, soybean, rice, wheat, and nutsedge tubers were planted in a growth medium and treated preemergence with the chemicals dissolved in a non-phytotoxic solvent. At the same time cotton having five leaves (including cotyledonary ones) bush beans with the third trifoliate leaf expanding, crabgrass with two leaves, barnyardgrass with two leaves, wild oats with one leaf, cassia with three leaves (including cotyledonary ones), morning glory with four leaves (including cotyledonary ones), cocklebur with four leaves (including cotyledonary ones), sorghum with three leaves, corn with three leaves, soybeans with two cotyledonary leaves, rice with two leaves, wheat with one leaf, and nutsedge with 3-5 leaves were sprayed. Treated plants and controls were maintained in a greenhouse for 16 days then all species were compared to control and visually rated for response to treatment. A qualitative (type of plant response) rating was made. The letter C indicates chlorosis/necrosis. A quantitative on a scale of 0 to 10 was also made. A rating of 0 means no effect. A rating of 10 means maximum effect, for example, complete kill in the case of chlorosis. Results obtained in this test for one of the compounds of this invention are given in the following table.

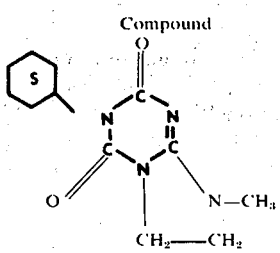

Compound

POST EMERGENCE

| KG/HA | 2 |
|---|---|
| Morningglory | 10C |
| Cocklebur | 10C |
| Cassia | 10C |
| Nutsedge | 7C |
| Crabgrass | 10C |
| Barnyardgrass | 10C |
| Wild Oats | 10C |

PRE-EMERGENCE

| Morningglory | 10C |
|---|---|
| Cocklebur | 10C |
| Cassia | 10C |
| Nutsedge | 10C |
| Crabgrass | 10C |
| Barnyardgrass | 10C |
| Wild Oats | 10C |

What is claimed is:
1. A compound of the formula:

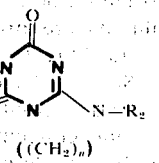

wherein
$R_1$ is alkyl of 2 through 8 carbon atoms, alkenyl of 3 through 6 carbon atoms, alkynyl of 3 through 6 carbon atoms, cycloalkyl of 4 through 8 carbon atoms, cycloalkenyl of 5 through 8 carbon atoms, cycloalkylmethyl of 4 through 9 carbon atoms, cycloalkenylmethyl of 6 through 9 carbon atoms, bicycloalkyl or bicycloalkenyl of 7 through 10 carbon atoms, bicycloalkylmethyl or bicycloalkenylmethyl of 8 through 11 carbon atoms, trimethylcyclohexyl, tetramethylcyclohexyl, tetrahydro-2-pyranyl; or

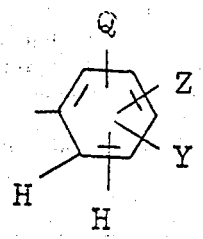

wherein
Q is hydrogen, fluorine, chlorine, bromine, alkyl of 1 through 4 carbon atoms, alkoxy, or alkylthio of 1 through 2 carbon atoms, nitro, or trifluoromethyl;
Y is hydrogen, chlorine, or methyl; and
Z is hydrogen or chlorine;
the above alkyl groups substituted with one methoxy, ethoxy, methylthio, or ethylthio group; the above cycloalkyl groups substituted with one alkyl of 2 through 4 carbon atoms, 1 through 2 methyl groups, 1 through 2 chlorines or bromines, one methoxy or one ethoxy group;
$R_2$ is hydrogen or methyl; and
$n$ is 2 or 3.

2. A compound of claim 1 wherein $R_1$ is alkyl of 3 through 6 carbon atoms, cycloalkyl of 5 through 8 carbon atoms, or cycloalkyl of 5 through 8 carbon atoms substituted with 1 methyl group; $R_2$ is methyl; and $n$ is 2.

3. The compound of claim 2 which is 3-cyclohexyl-6,7-dihydro-8-methyl-imidazo[1,2-a]-s-triazine-2,4-(3H,8H)-dione.

* * * * *

UNITED STATES PATENT OFFICE
CERTIFICATE OF CORRECTION

PATENT NO. : 3,907,796

DATED : September 23, 1975

INVENTOR(S) : Richard A. Jewell and Kang Lin

It is certified that error appears in the above-identified patent and that said Letters Patent are hereby corrected as shown below:

At column 11, approximately line 45; at columns 12, 13, 14, 15 and 16, at approximately line 5 of each; and at claim 1, line 2 (column 20, approximately line 15) the formula should be:

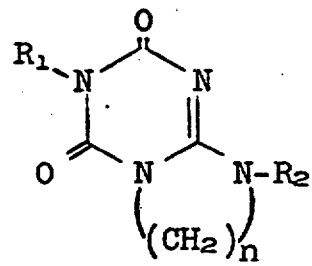

Signed and Sealed this twenty-fifth Day of May 1976

[SEAL]

Attest:

RUTH C. MASON
Attesting Officer

C. MARSHALL DANN
Commissioner of Patents and Trademarks